C. E. REED.
TAILOR'S MEASURING INSTRUMENT.
APPLICATION FILED JUNE 18, 1915. RENEWED MAY 31, 1916.
1,215,193. Patented Feb. 6, 1917.
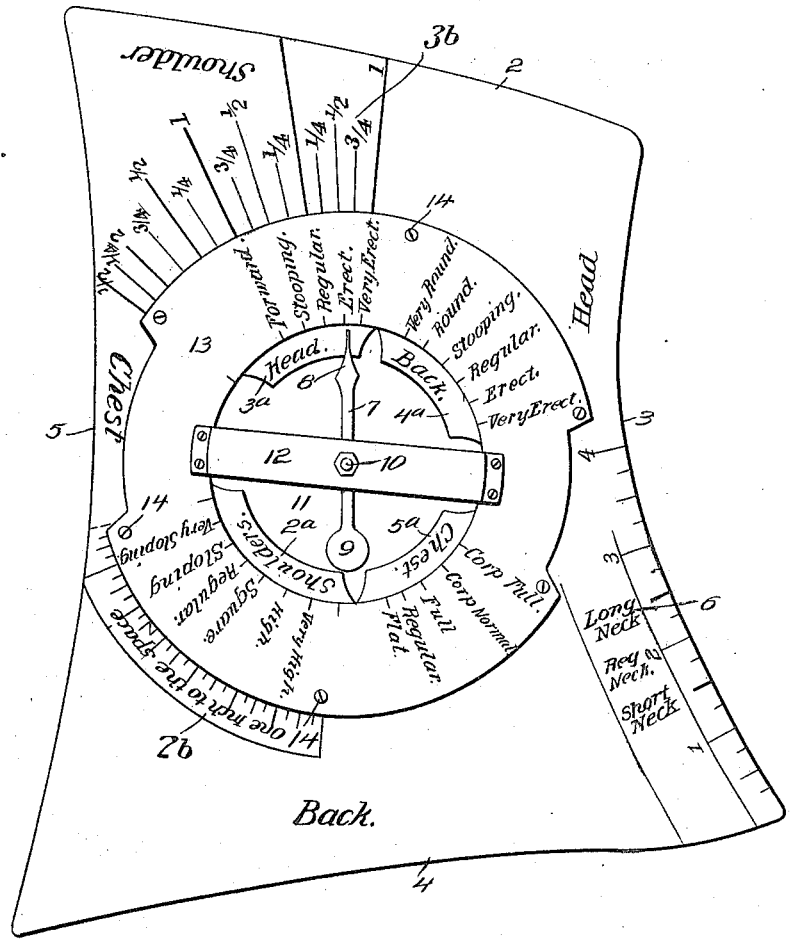
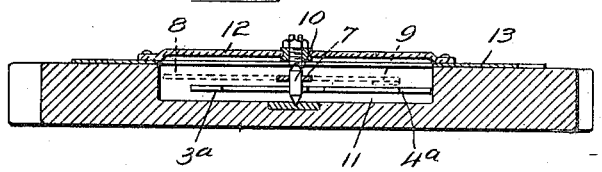
Inventor
Charles E. Reed.
Witnesses
F. C. Gibson.
By Victor J. Evans
Attorney

UNITED STATES PATENT OFFICE.

CHARLES E. REED, OF WARRENSBURG, MISSOURI.

TAILOR'S MEASURING INSTRUMENT.

1,215,193.     Specification of Letters Patent.     Patented Feb. 6, 1917.

Application filed June 18, 1915, Serial No. 34,891. Renewed May 31, 1916. Serial No. 100,966.

*To all whom it may concern:*

Be it known that I, CHARLES E. REED, a citizen of the United States, residing at Warrensburg, in the county of Johnson and State of Missouri, have invented new and useful Improvements in Tailors' Measuring Instruments, of which the following is a specification.

This invention is an improved tailor's measuring instrument, which I call "shoulder points" and which correctly ascertains and properly names the natural standing position or carriage of the head and shoulders of persons measured for garments, the object of the invention being to provide an improved implement of this kind, which is cheap and simple, which may be readily and quickly used, and which accurately indicates the natural standing position or carriage of the person, as to the head, shoulders, chest, neck and back.

The invention consists in the construction and arrangement of devices hereinafter described and claimed.

In the accompanying drawings:

Figure 1 is a plan of a measuring or indicating instrument constructed in accordance with my invention.

Fig. 2 is a transverse sectional view of the same.

In accordance with my invention, I provide a board 1 which is shaped to present sides or edges 2, 3, 4 and 5 which respectively are shaped and proportioned to fit against the shoulder, back of head, back, or chest. The head edge 3 is provided at its lower end with a scale 6 used in ascertaining the length of neck of the person measured.

In the center of the board is a balanced indicating hand 7 which has a point 8 at one end and a counterbalancing weight 9 at the other end and which has a pivotal shaft 10, one end of which is in a bearing in the bottom of a circular opening 11 in the board, the other end of said pivotal shaft being mounted in a bearing in a cross bar 12 which extends across the center of said opening and which is secured on a dial plate 13, said dial plate being concentric with the opening and secured on the board by screws 14.

The dial plate is provided at its inner side with a shoulder scale $2^a$, which is inscribed "shoulder;" a head scale $3^a$ which is inscribed "head;" a back scale $4^a$ which is inscribed "back" and a chest scale $5^a$ which is inscribed "chest." The subdivisions of the shoulder scale respectively indicate "high," "square," "regular," "sloping" and "very sloping." The subdivisions of the head scale respectively indicate "forward," "stooping," "regular," "erect," and "very erect;" the subdivisions of the back scale respectively indicate "very round," "round," "stooping," "regular," "erect," and "very erect." The subdivisions of the chest scale indicate "corpulent full," "corpulent normal," "corpulent flat," "full," "regular" and "flat."

The indicating hand is centrally pivoted with respect to the dial surface in common with all the scales thereof. In using the device 1 all its edges will be appropriately applied to the shoulders, back of head, back, and chest, as the case may be, of the person being measured; the resulting position of the device, it being held in a vertical plane, will cause the indicating hand in co-action with the corresponding scale, to indicate the characteristic position, shape, or slope of said member.

Inscribed on the board 1 concentrically of the head scale $3^a$ is a scale $3^b$ graduated to a quarter of an inch and coöperating with the point 8 on the hand 7 to indicate the angular position of the head, while inscribed on the board 4 concentrically of the shoulder scale $2^a$ is a scale $2^b$ graduated to fractions of an inch and coöperating with the point 8 of the hand 7 to indicate, in fractions of an inch, the relative heights of the shoulders.

Having thus described my invention, I claim:—

An instrument of the class described comprising a board having edges respectively shaped and proportioned to conform with and to fit against the shoulders, back of head, back and chest of a person, and also having a centrally arranged pivotally mounted and weighted indicating hand and scales over which said hand sweeps and provided with designating subdivisions.

In testimony whereof I affix my signature in presence of two witnesses.

CHARLES E. REED.

Witnesses:
JAMES C. THORNTON,
JOSEPH E. BELT.

Copies of this patent may be obtained for five cents each, by addressing the "Commissioner of Patents, Washington, D. C."